Jan. 29, 1924.

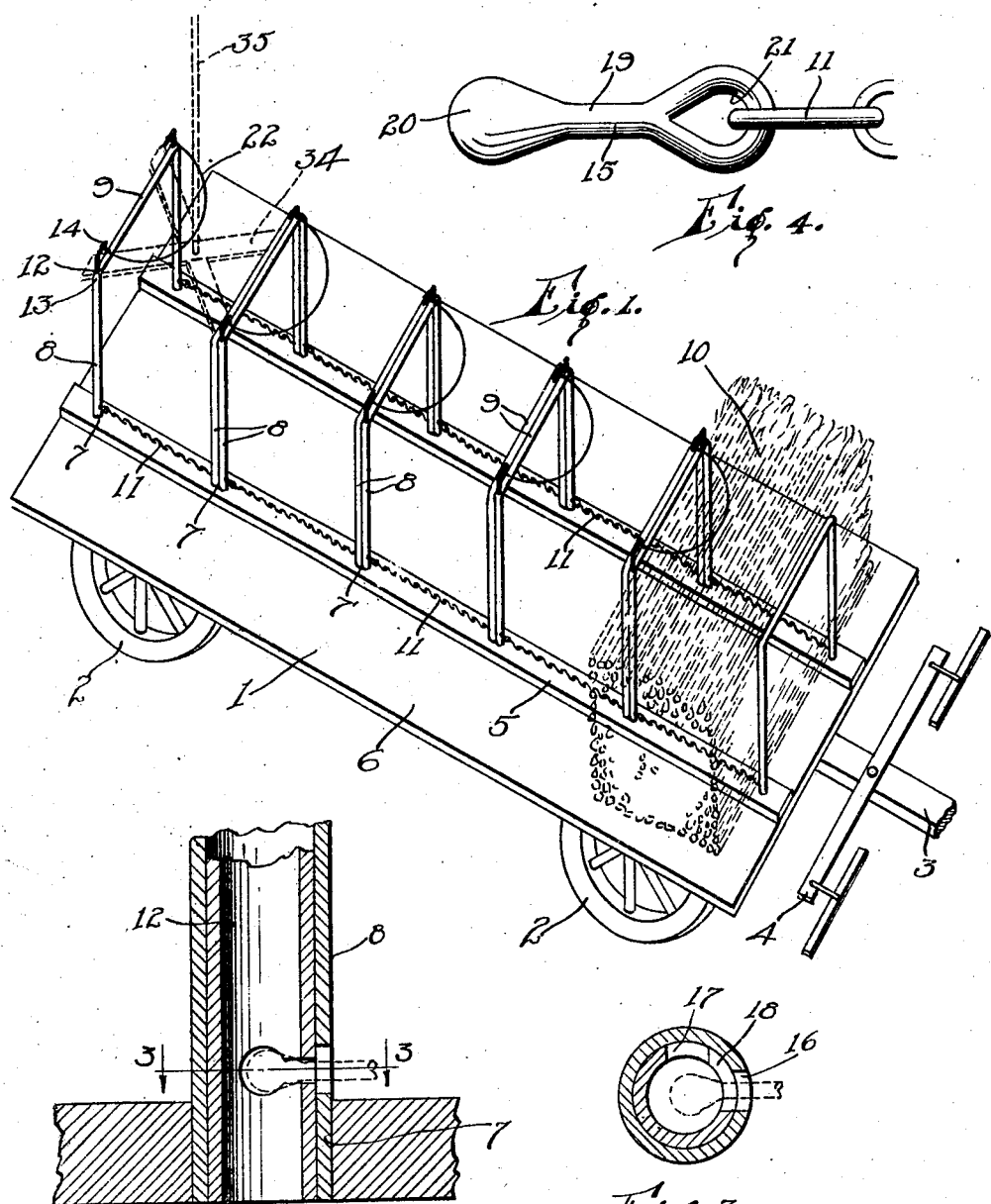

P. M. RINDESBACHER 1,482,093

UNLOADING DEVICE FOR CORN

Filed June 24, 1922   2 Sheets-Sheet 2

INVENTOR
P. M. Rindesbacher
BY
ATTORNEYS

Patented Jan. 29, 1924.

1,482,093

UNITED STATES PATENT OFFICE.

PETER M. RINDESBACHER, OF STOCKTON, ILLINOIS.

UNLOADING DEVICE FOR CORN.

Application filed June 24, 1922. Serial No. 570,639.

*To all whom it may concern:*

Be it known that I, PETER M. RINDESBACHER, a citizen of the United States, and a resident of Stockton, in the county of Jo Daviess and State of Illinois, have invented a new and useful Improvement in Unloading Devices for Corn, of which the following is a full, clear, and exact description.

My invention relates to improvements in unloading devices for corn, and it consists in the combinations, constructions, and arrangements herein described and claimed.

An object of my invention is to provide a wagon which is adapted to be used to convey corn from the field to the storing place, the wagon having means for storing the corn into a plurality of piles which may be readily removed from the wagon.

A further object of my invention is to provide a device of the character described in which the means for removing the piles from the wagon may be readily unlocked so as to dispose the pile of corn in any place desired.

A further object of my invention is to provide a corn carrying member which may be readily secured to an ordinary wagon with but slight alterations being necessary in the latter.

A further object of my invention is to provide a device of the character described which is simple in construction and durable and efficient for the purpose intended.

Other objects and advantages will appear in the following specification, and the novel features of the invention will be particularly pointed out in the appended claims.

My invention is illustrated in the accompanying drawings, forming part of this application, in which—

Figure 5:
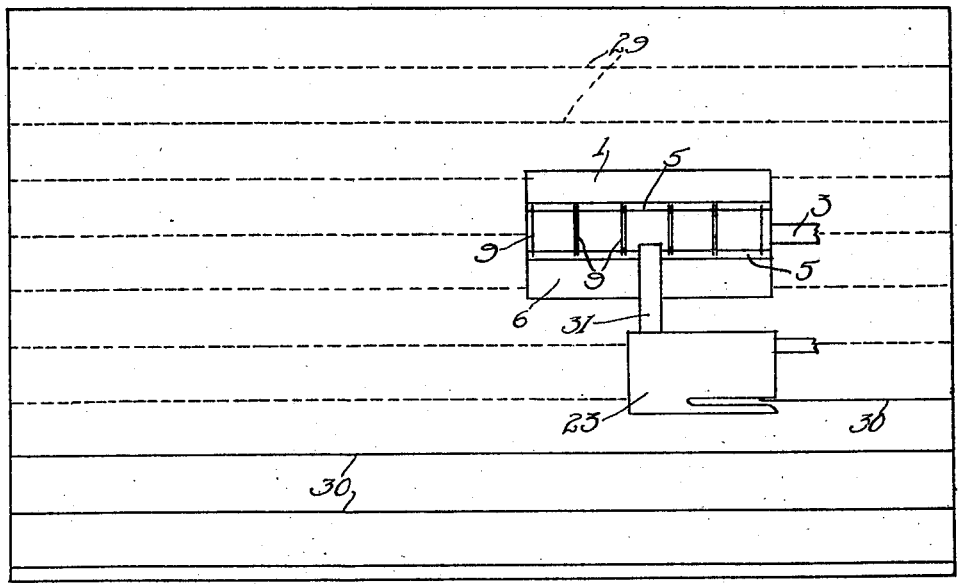
Figure 6:
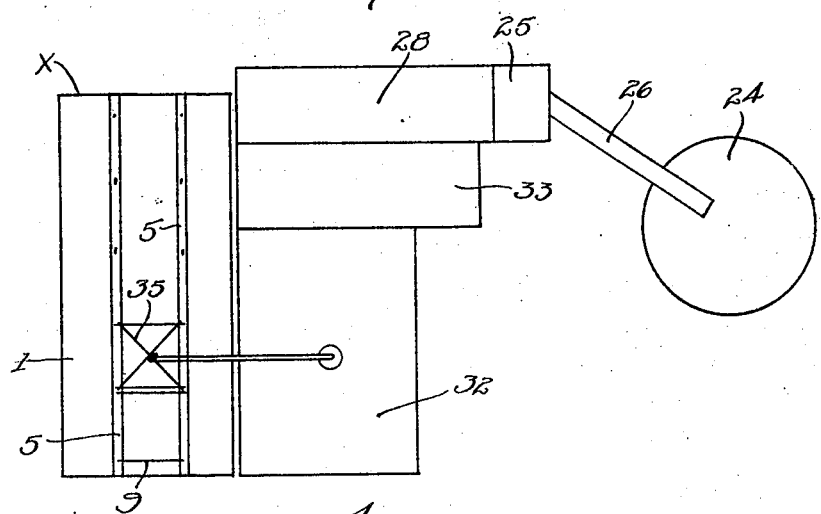

Figure 1 is a perspective view of the wagon, showing the device operatively applied thereto, Figure 2 is an enlarged sectional view of a portion of the device, Figure 3 is a section along the line 3—3 of Figure 2, Figure 4 is an enlarged detail of a portion of the device, Figure 5 is a diagrammatic view of the wagon as used in combination with a corn cutter, and Figure 6 is a diagrammatic view of the wagon as shown in combination with an unloading crane and a silo.

In carrying out my invention, I make use of a wagon, which comprises a platform 1 and supporting wheels 2. The wagon is provided with the usual tongue 3 and with a whiffle-tree 4. Two longitudinally extending beams 5 are secured to the upper surface of the wagon 1 and are spaced from the sides of the wagon, thereby providing sections 6 between the beams 5 and the sides of the wagon. The sections 6 act as platforms upon which the operator may walk.

As clearly shown in Figure 2, the beams 5 have openings 7 therein which are adapted to receive the legs 8 of U-shaped members 9. The members 9 are provided in pairs and in the present form of the device I have shown five pairs or sets which are removably disposed on the wagon. The openings in the beams 5, which are disposed between the adjacent pairs of members 9, are elongated, as at 7'. The adjacent members 9 of the sets are disposed in the slots 7', as clearly shown in Figure 1. The sets are adapted to have corn 10, or other grain, disposed therein in the manner shown in Figure 1. The members 9 of each set are removably secured to each other at their lower ends by chains 11.

In Figures 2 and 3 I have shown the means by which the members 9 of each set are removably secured to each other. It will be noted that the legs 8 have pipes 12 rotatably disposed therein, the pipes projecting exteriorly of the member 9 at the point of curve 13 of the members. The upper ends of the pipes 12 are provided with cranks 14, whereby the pipes 12 may be rotated with respect to the legs 8. It should be noted that only one of the members 9 in each set is provided with a pipe 12 in each of its legs. A bolt 15 of the shape shown in Figure 4 is adapted to be disposed in alined openings 16 and 17 of the legs 8 and the pipes 12, respectively. The opening 17 has a slot 18 extending therefrom which is adapted to receive the shank 19 of the bolt. From this construction it will be apparent that the head 20 of the bolt may be disposed within the alined openings 17 and 16, and be locked in place by merely rotating the pipe 12 so as to cause the slot 18 to receive the shank 19. The bolt 20 is provided with an eyelet 21 to which the chain 11 is secured, the free end of the chain being rigidly secured to the other member of the set. The cranks 14 are so connected to the pipes 12 that they will cause the slots 18 to be alined with the openings 16 when the cranks are parallel with the cross bar of the members 9 (see Figures 1 and 3).

As heretofore stated, the members 9 are removably secured to the beams 5 and are also removably secured to each other so as to provide sets. The U-shaped members 9, together with the detachable chains 11, constitute a sling having rigid sides, which when lifted bodily will carry the corn with it. When it is desired to release the corn from the sling, a cable 22, which is connected to the free ends of the cranks 14, is moved so as to swing the arms 14 at right angles to the cross bar of the member 9. This operation alines the openings 17 and 16 and permits the weight of the corn to remove the bolts from the openings. As clearly shown in Figure 4, the head of each bolt is tapered so as to readily be disengaged from the legs 8 when the openings 16 and 17 are alined.

From the foregoing description of the various parts of the device, the operation thereof may be readily understood. The wagon is especially adapted to be used in gathering corn, and it is designed so as to reduce the number of movements necessary to gather the corn, to a minimum. Heretofore it has been customary to have the corn cutter and binder 23 (see Figure 5) travel down the row of corn and cut and bind the corn into a number of bundles. The corn thus cut is dropped on the ground and has to be manually lifted onto a wagon. This operation not only takes time, but material, since it uses the twine to hold the corn in bundles. After the wagon is filled with the corn, it is taken to the silo 24 (see Figure 6) and is removed by hand to a cutting table 25, the table being provided with a chute 26 which conveys the corn from the table to the top of the silo. It is therefore obvious that in the present handling of corn, the corn has to be first tied in bundles, then manually deposited on the wagon, and then manually removed from the wagon and placed upon the conveyor 28 of the cutting table. With my present device, these operations are eliminated, thereby reducing the number of laborers necessary, and greatly decreasing the time of cutting and storing of a field of corn.

In Figure 5 I have shown a diagrammatic view of the wagon in connection with the corn cutter 23. The dotted lines 29 represent cut rows of corn, and the full lines 30 represent uncut rows of corn. The corn cutter 23 is moved along the uncut row of corn 30 by tractor or horses, and cuts the corn in the ordinary manner. The cutter 23, instead of binding the corn in bundles, is provided with a conveyor 31 which conveys the corn from the cutter to the wagon.

It is obvious that the wagon will be moved at the same speed as the cutter 23. The cutter 23 is adapted to dispose the cut corn on the conveyor 31 so that the corn lies parallel with the longitudinal sides of the conveyor. The corn is then carried to the wagon and is dropped in any one of the five corn receiving sets heretofore described. In the present showing in Figure 5, the first two sets of the wagon have been filled with corn and the cutter and conveyor are now filling the third set. The man driving the team may walk along the sides 6 of the wagon and adjust the corn if needed. After the wagon has been filled with the necessary amount of corn, it is drawn to the silo 24 (see Figure 6). The silo 24 is preferably provided with a crane 32, a stationary table 33, and the cutting table 25. The wagon 1 is disposed in the position shown with respect to the crane 32. The crane carries a cross piece 34 at the end of the cable 35 (see Figure 1), the cross piece being adapted to be disposed beneath the cross pieces of the members 9 and to lift the members from the beams 5. With the wagon 1 in the position shown in Figure 6, the set adjacent to the end X of the wagon is first lifted from the beams 5 and is swung around so as to be disposed above the table 33. The crane 32 accomplishes this result. When the set containing the corn is above the table 33, the cable is pulled manually and this releases the chains 11. The weight of the corn will now remove the bolts 15 from the legs 8, whereby the corn will drop upon the table. From the operation thus far, it will be observed that the corn is loaded directly onto the wagon without the necessity of first tying the corn into bundles and then loading the bundles onto the wagon by manual labor. It will further be observed that the corn is removed from the wagon in relatively large quantities without the use of manual labor. The device therefore cuts down the number of laborers needed to a minimum and also obviates the necessity of first tying the corn into bundles. After the corn has been released from the first set, the crane is swung back so as to remove the second set from the wagon. This operation is repeated until all five sets, or as many sets as are on the wagon, have been removed. The corn is then manually moved from the table 33 to the conveyor 28 of the cutting table 25. The corn is here cut in the ordinary manner and is conveyed through the chute 26 to the top of the silo 24. The sets may be readily disposed in place on the wagon, thereby permitting the wagon to return to the field for another load. If desired, the corn which is to be contained in the top of the silo, may be removed of its ears, since this corn merely acts as a cover for the ensilage and usually spoils. In this manner, the corn is saved and is not spoiled.

It is obvious that a wagon of the type described will handle the corn much more quickly and with far less labor than is required when an ordinary wagon is used.

I claim:

1. The combination with a vehicle having a load supporting portion, of a sling having rigid sides and a flexible bottom arranged to rest on the load supporting portion, means for detachably connecting the sides rigidly to the load supporting portion, and means for detaching the flexible bottom from one of said side members at will.

2. The combination with a vehicle having a load supporting portion, of a plurality of slings, each of said slings comprising rigid side members, detachable flexible connections between the side members of each pair, and means for detachably securing the rigid side members of all of said slings to said load supporting portion.

3. In a device of the type described, a pair of U-shaped members, each leg of one of said members having an opening therein adjacent to the end thereof, a pipe rotatably disposed in each leg and having an opening adapted to be alined with the opening in said leg, the openings in said pipes having slots communicating therewith, chains secured to the legs of the second member, bolts carried by the free ends of said chains and having heads adapted to enter said openings when they are alined, said slots being adapted to receive the shanks of said bolts when said pipes are rotated, and means for rotating said pipes.

4. The combination with a wagon, of two longitudinally extending beams having openings therein and being secured to the upper surface of said wagon and being spaced from the sides of said wagon, sets of U-shaped members removably disposed in said openings, said sets comprising two members removably secured to each other and being adapted to divide the load on the wagon into a plurality of bundles, said sets being adapted to remove the bundles, and means for unlocking said members of each set from each other.

5. The combination with a wagon, of two parallel beams carried by said wagon and being spaced from the longitudinal sides of the wagon, said beams having openings therein, U-shaped members having openings in the legs thereof and adapted to be disposed in the openings of said beams, pipes rotatably disposed in the legs and having openings adapted to aline with the openings in the legs, the openings in said pipes having slots communicating therewith, a plurality of U-shaped members disposed in the openings of said beams and alternating with said first named members, chains connecting said first and second named members together, and bolts carried by said chains and having heads adapted to enter the openings in said pipes and legs when said openings are alined, said slots being adapted to receive the shanks of said bolts.

6. A device of the type described comprising a U-shaped member having an opening in each leg thereof, a pipe rotatably disposed in each leg and having an opening adapted to be alined with the opening in the leg, a crank arm carried by each pipe, a cable secured to said arms, a second U-shaped arm, a chain carried by each leg of said second named U-shaped member, and a bolt carried by the free end of each chain and being adapted to be received in said openings when said openings are alined, said bolts being locked to said first named member when said slots receive the shanks of said bolts.

PETER M. RINDESBACHER.